BEST AVAILABLE COPY

T. C. PROUTY.

PUMP FOR SPEEDOMETERS.

APPLICATION FILED MAY 29, 1920.

Reissued July 20, 1920. 14,922.

Witness:
P. H. Schleicher

Inventor:
Theodore C. Prouty,
By Chester H. Brasellow
Attorney.

UNITED STATES PATENT OFFICE.

THEODORE C. PROUTY, OF HERMOSA BEACH, CALIFORNIA, ASSIGNOR, BY MESNE ASSIGNMENTS, TO VAN SICKLEN SPEEDOMETER COMPANY, OF WILMINGTON, DELAWARE, A CORPORATION OF DELAWARE.

PUMP FOR SPEEDOMETERS.

14,922. Specification of Reissued Letters Patent. Reissued July 20, 1920.

Original application filed March 28, 1914, Serial No. 827,911. Renewed August 6, 1917, Serial No. 184,787. Original No. 1,256,829, dated February 19, 1918. Application for reissue filed May 29, 1920. Serial No. 385,366.

*To all whom it may concern:*

Be it known that I, THEODORE C. PROUTY, a citizen of the United States, residing at Hermosa Beach, in the county of Los Angeles and State of California, have invented certain new and useful Improvements in Pumps for Speedometers, of which the following is a specification.

This invention relates to improvements in pumps for speedometers, and has for its object to provide an improved pump comprising a pair of intermeshing cogs or pumping elements of a type well known in general pumping construction.

My invention further comprises a new and improved arrangement for supporting and driving such pumping elements.

These and other objects will be set forth and illustrated in the following specification and accompanying drawings, in which.

Like numerals refer to like elements throughout the drawings, in which.

Figure 1:
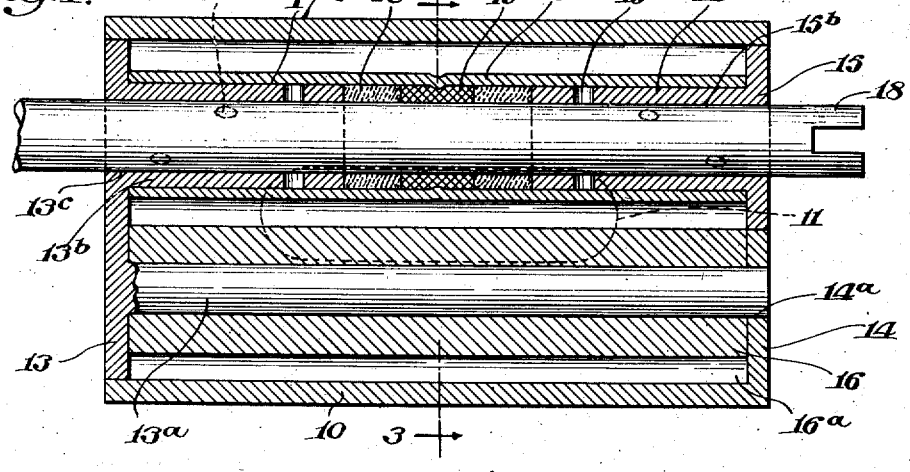
Figure 1 is a longitudinal section through a pump embodying my invention.
Figure 2:
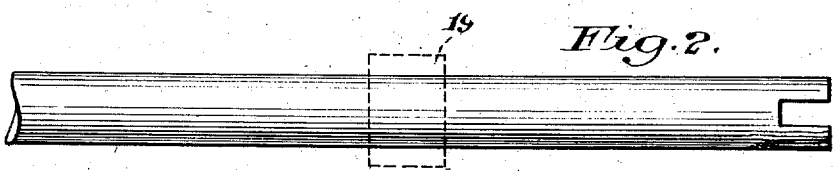
Fig. 2 is a side elevation of the shaft.
Figure 3:
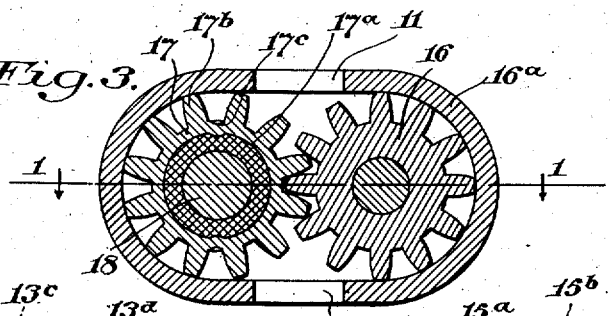
Fig. 3 is a transverse section along the line 3—3 of Fig. 1.
Figure 4:
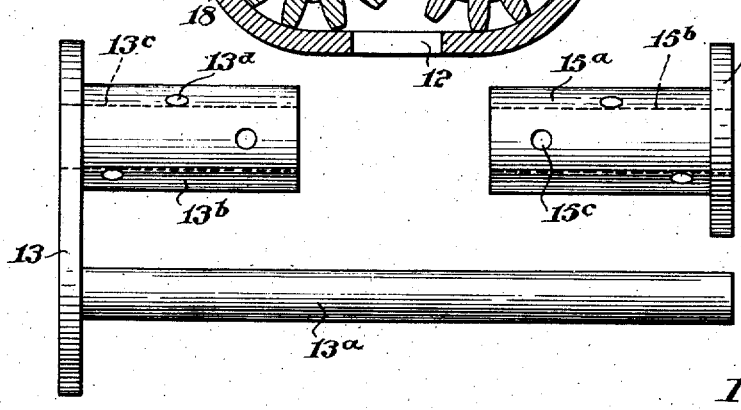
Fig. 4 is a side elevation showing the arrangement of the end plates and bearings.

10 designates generally a casing of suitable contour in which are provided the inlet 11 and outlet 12, as shown in Fig. 3. This casing is provided with the end plate 13 closing one end thereof and the end plate 14 closing the other end thereof. The end plate 13 is provided with the supporting axle $13^a$ formed integral therewith and adapted to extend through the casing 10 and seat in the aperture $14^a$ in the end plate 14. The end plate 13 is further provided with the inwardly extending bearing portion $13^b$ centrally bored or apertured, as indicated by numeral $13^c$. A number of cross apertures $13^d$ extend from the outer side of this bearing portion $13^b$ from the central bore or aperture $13^c$, as shown for example in Fig. 4. A bearing plate 15 is carried by the end plate 14 and comprises a detachable portion thereof, as indicated in Fig. 4. This bearing plate 15 is provided with the inwardly extending bearing portion $15^a$ similar in construction to bearing $13^b$ and apertured or bored as indicated by numeral $15^b$, the bore or aperture $15^b$ being in alinement with aperture $13^c$. Similar cross apertures $15^c$ are provided in bearing portion $15^a$. The inner extremities of these bearing portions $15^a$—$13^b$ are spaced apart a suitable distance for a purpose to be explained below. A rotatable cog or pump element 16 is rotatably mounted upon the axle $13^a$, as shown in Fig. 1, and is provided with the usual form of teeth $16^a$. A similar rotating element 17 is rotatably mounted upon the bearings $13^b$ between the end plates 13—14, as shown in Fig. 1, this cog being centrally apertured or bored as indicated by numeral $17^a$ to rotatably fit upon bearing portions $15^a$—$13^b$ and having teeth $17^b$ meshing with the teeth of pump element 16. The pumping element 17 is the driving or actuating element and to provide for driving the same I utilize the shaft 18 extending through the apertures $15^a$—$13^b$ and journaled therein. This shaft 18 carries a collar 19 intermediate its extremities, this collar, when the device is assembled, being located between the inner ends of the bearings $15^a$—$13^b$ in the bore $17^a$ of the pumping element 17, this collar closely fitting the said bore. In the embodiment shown in the drawings, I construct this collar of comparatively soft metal such as alloy or the like, shrunk on or otherwise securely attached to the shaft 18. I then, by means of a set or punch indent portions of the pumping elements 17 into said collar 19, as indicated by numeral $17^c$, see Fig. 3.

In constructing and arranging my device I preferably leave spaces or chambers 20 between each side of the collar 19 and the adjacent extremity of the bearing portions $13^b$—$15^a$. In these chambers or spaces I pack grease, oil or other suitable lubricant when the device is assembled, and as is well known to those skilled in the art, a certain amount of this lubricant will work its way along the rod 18 and along the outer surface of the bearings $13^b$—$15^a$ between such bearings and the inner periphery of the aperture $17^a$ of pumping element 17. This lubricating effect is enhanced by the use of cross apertures $15^c$—$13^d$.

I have found that the actuated pump element 16, as I term it, is suitably journaled by the construction shown and complications do not arise since it is driven by the actuating element 17. Difficulty has been found, however, in suitably supporting the latter element in such a form of pump, especially when used in connection with a fluid actuated speedometer, and I have found that by use of my invention, as set forth and shown herein, I provide a substantial gear bearing surface for the actuating element 17, at the same time providing a similar bearing support or journal for the driving shaft while also arranging for positive and efficient driving relation between said shaft and actuating pump element. At the same time my construction and arrangement enables me to readily assemble and disassemble the entire device, as will be apparent from examination of the drawings and reading of the specification, it being merely necessary to remove end plate 13, together with bearing plate 15 to permit the entire removal of the pump structure from the casing.

While I have shown and described my device with more or less particularity, I do not wish to be restricted to such showing or description beyond the scope of the appended claims.

What I claim is:—

1. In a device of the class described, the combination of rotatable fluid actuating mechanism, bearing mechanism upon which said rotatable mechanism is rotatably mounted and provided with a concentric axial bore, shaft mechanism extending through and journaled in said axial bore, a collar secured to said shaft and having embedded therein portions of said rotatable fluid actuating mechanism, whereby said rotatable fluid actuating mechanism and said shaft rotate in unison.

2. In a device of the class described, the combination of rotatable pumping mechanism provided with a longitudinal axial bore, bearing mechanism extending into the axial bore of said pumping mechanism and upon which said pumping mechanism is rotatably mounted, said bearing mechanism being provided with a concentric axial bore, shaft mechanism rotatably journaled in the axial bore of said bearing mechanism, and a collar mounted on said shaft mechanism, and located in the axial bore of the pumping mechanism to operatively connect said rotatable pumping and shaft mechanism.

3. In a device of the class described, the combination of rotatable pumping mechanism provided with an axial bore, bearing mechanism extending into the bore at each end of said rotatable pumping mechanism arranged to leave a chamber at or near the center of the bore of the rotatable pumping mechanism and in turn provided with concentric axial bores, shaft mechanism rotatably journaled in the bore of said bearing mechanism, and a collar carried by said rotatable shaft and located in the axial chamber of said rotatable pumping mechanism, and operatively connecting said pumping and shaft mechanism together.

4. In a device of the class described, the combination of rotatable pumping mechanism provided with axial bores, bearings extending into each end of the axial bore of said pumping mechanism upon which said pumping mechanism is rotatably mounted and constructed to leave a centrally located axial chamber in said pumping mechanism, a drive shaft and a collar mounted on and secured to said shaft in the central axial chamber of said pumping mechanism and into which portions of said pumping mechanism are embedded so as to form an operative connection between said shaft and pumping mechanism.

5. In a device of the class described, a casing, end plates for said casing, said end plates being provided with inwardly extending bearing portions, said bearing portions being bored or apertured, a longitudinally bored pumping member rotatably mounted on said bearing portions and a drive shaft extending through the apertures in said bearing portions and journaled therein, said shaft being provided with a collar engaging said pumping member and mounted in the aperture therein.

6. In a device of the class described, a casing, end plates for said casing, said end plates being provided with inwardly extending bearing portions, said bearing portions being bored or apertured, a longitudinally bored pumping member rotatably mounted on said bearing portions, a shaft extending through the apertures in said bearing portions and journaled therein, said shaft being provided with a collar engaging said pumping member and mounted in the aperture therein, said collar being spaced from and located between said bearing portions whereby spaces are afforded for oil or grease to lubricate said pumping member and shaft.

7. In a device of the class described, a casing, end plates for said casing, said end plates being provided with inwardly extending bearing portions, said bearing portions being bored or apertured, a longitudinally bored pumping member rotatably mounted on said bearing portions, a shaft extending through the apertures in said bearing portions and journaled therein, said shaft being provided with a collar engaging said pumping member and mounted in the aperture therein, said collar being spaced from and located between said bearing portions whereby spaces are afforded for oil or grease to lubricate said pumping member and shaft, said bearings being cross apertured to permit access of said oil or grease.

In testimony whereof I have subscribed my name.

THEODORE C. PROUTY.